(12) United States Patent
Yang et al.

(10) Patent No.: US 7,442,044 B2
(45) Date of Patent: Oct. 28, 2008

(54) CHIP CARD RETAINING MECHANISM

(75) Inventors: Qing Yang, Shezhen (CN); Chia-Hua Chen, Tucheng (TW)

(73) Assignees: ShenZhen Futaihong Precision Industry Co., Ltd., ShenZhen, Guanghong Province (CN); Sutech Trading Limited, Tortola (VG)

( * ) Notice: Subject to any disclaimer, the term of this patent is extended or adjusted under 35 U.S.C. 154(b) by 126 days.

(21) Appl. No.: 11/309,686

(22) Filed: Sep. 12, 2006

(65) Prior Publication Data

US 2007/0158419 A1    Jul. 12, 2007

(30) Foreign Application Priority Data

Dec. 16, 2005   (CN) .................... 2005 1 0120727

(51) Int. Cl.
*H01R 12/00*   (2006.01)
(52) U.S. Cl. .................... 439/64; 439/328; 439/630
(58) Field of Classification Search ......... 439/326–328, 439/630, 159, 357, 64, 570, 862, 363
See application file for complete search history.

(56) References Cited

U.S. PATENT DOCUMENTS

| | | | |
|---|---|---|---|
| 6,881,086 B2 * | 4/2005 | Ohashi | 439/326 |
| 6,951,470 B1 * | 10/2005 | Huang | 439/159 |
| 7,056,153 B2 * | 6/2006 | Watanabe et al. | 439/630 |
| 7,112,075 B1 * | 9/2006 | Su | 439/159 |
| 7,329,146 B2 * | 2/2008 | Yang et al. | 439/570 |
| 2005/0239333 A1 * | 10/2005 | Watanabe et al. | 439/630 |

* cited by examiner

*Primary Examiner*—Tulsidas C. Patel
*Assistant Examiner*—Harshad C Patel
(74) *Attorney, Agent, or Firm*—Steven M. Reiss (57) ABSTRACT

A chip card retaining mechanism for detachably retaining a chip card (50) and allowing the chip card to be connected to terminals (20) formed on a printed circuit board (60). The chip card retaining mechanism includes a base (10), two locking members (30). The base has a first surface (11) for exposing the terminals. The locking members are arranged at lateral sides of the base. Each locking member has a top plate (32) configured for limiting movement of the chip card along a horizontal direction. Each locking member further includes a stopper (324) formed at one end thereof and disposed at a movement path of the chip card in a horizontal direction. The base, and the locking members cooperatively define a receiving space for receiving the chip card therein.

14 Claims, 9 Drawing Sheets

CHIP CARD RETAINING MECHANISM

DESCRIPTION

1. Field of the Invention

The present invention generally relates to chip card retaining mechanisms and, more particularly, to a chip card retaining mechanism for seating a chip card in an electronic device such as a mobile phone.

2. Description of Related Art

Nowadays, electronic devices such as mobile phones are widely used and bring convenience to our lives, and as such, electronic devices have become a part of modern life. Every electronic device has a chip card such as a SIM (subscriber identification module) card for carrying information necessary for operating the mobile phone. The chip card may also contain personal information for the subscriber, for example, a listing of frequently used telephone numbers. However, it is essential to provide a chip card retaining mechanism to hold the chip card in the electronic device and thus ensure information transfer.

Figure 9:
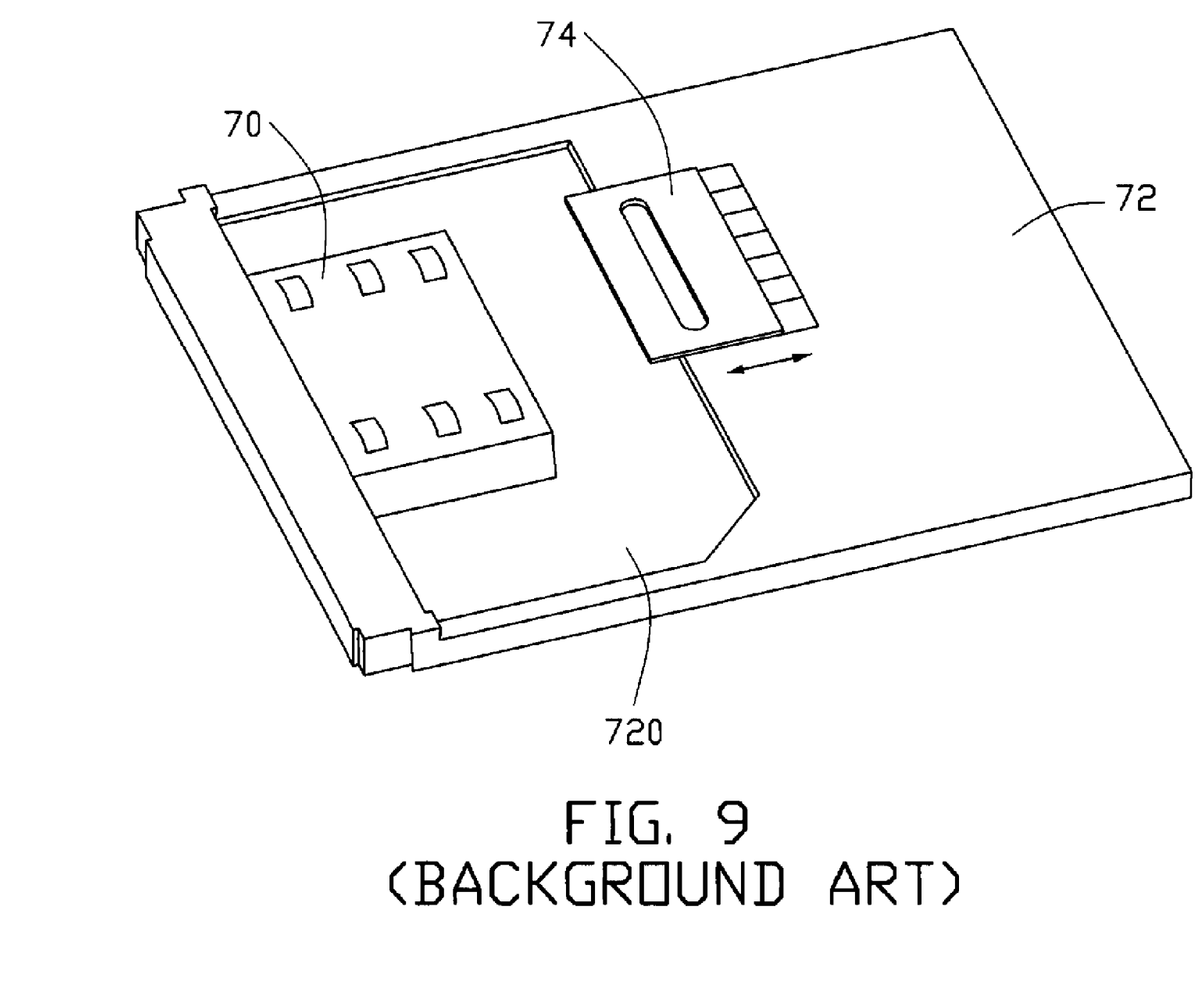
FIG. 9 is an exploded, isometric view of a typical chip card retaining mechanism.

Referring to FIG. 9, a typical chip card retaining mechanism used in a mobile phone is as follows. The chip card retaining mechanism includes a mounting base 72 and a locking element 74. A receiving groove 720 is defined in the mounting base 72 for receiving a chip card. A connector 70 is disposed in the receiving groove 720. The locking element 74 is mounted on the mounting base 72 and located adjacent to the receiving groove 720. The locking element 74 can move in a direction shown by an arrow. In assembly, the locking element 74 is pushed away from the receiving groove 720 to completely expose the receiving groove 720. A SIM card is received in the receiving groove 720, and the locking element 74 is pushed toward the receiving groove 720 to cover a portion of the receiving groove 720 so that the SIM card cannot be removed from the receiving groove 720.

Although the locking element 74 can be easily moved to assembly the SIM card, when a mobile phone inadvertently undergoes impact, this impact may result in an outer force which removes the locking element 74 from the receiving groove 720, which can result in an ineffective electrical connection between the SIM card and the connector 70. At worst, the SIM card may become completely separated from the receiving groove 720, which badly affects stability of the mobile phone.

What is needed, therefore, is a chip card retaining mechanism, which can overcomes the above-described shortcomings.

SUMMARY OF THE INVENTION

In a first preferred embodiment, a chip card retaining mechanism for detachably retaining a chip card and allowing the chip card to be connected to terminals formed on a printed circuit board. The chip card retaining mechanism includes a base, and two locking members. The base has a first surface for exposing the terminals. The locking members are arranged at lateral sides of the base. Each locking member has a top plate configured (i.e., structured and arranged) for limiting movement of the chip card along a horizontal direction. Each locking member further includes a stopper formed at one end thereof and disposed at a movement path of the chip card in a horizontal direction. The base, the locking members cooperatively define a receiving space for receiving the chip card therein.

Other advantages and novel features of the preferred embodiments of the present chip card retaining mechanism and its applications will become more apparent from the following detailed description when taken in conjunction with the accompanying drawings.

BRIEF DESCRIPTION OF THE DRAWINGS

Many aspects of the present chip card retaining mechanisms and their applications can be better understood with reference to the following drawings. The components in the drawings are not necessarily drawn to scale, the emphasis instead being placed upon clearly illustrating the principles of the chip card retaining mechanisms. Moreover, in the drawings, like reference numerals designate corresponding parts throughout the several views.

DETAILED DESCRIPTION OF THE INVENTION

Figure 1:
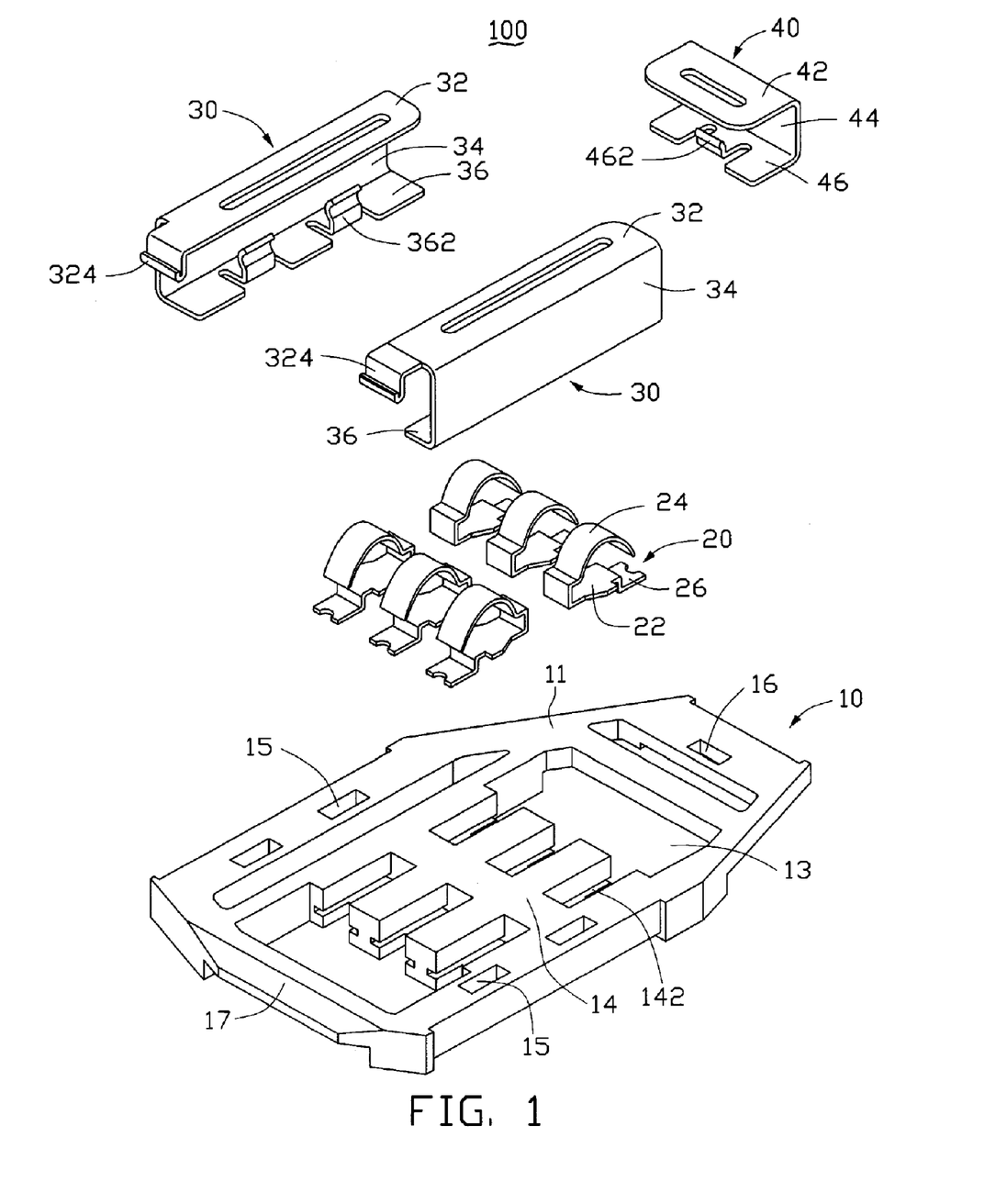
FIG. 1 is an exploded, isometric view of a chip card retaining mechanism in accordance with a preferred embodiment.

A chip card retaining mechanism is adapted for retaining a chip card in an electronic device such that the chip card is electronically connected with a connector in the electronic device. Referring to FIG. 1, in order to identify the used mobile phone, when communicating, a chip card 60, such as a subscriber identification module, also called SIM card, is provided. The chip card retaining mechanism 100 includes a base 10, a plurality of contact terminals 20, two locking members 30, and a resisting member 40.

Figure 2:
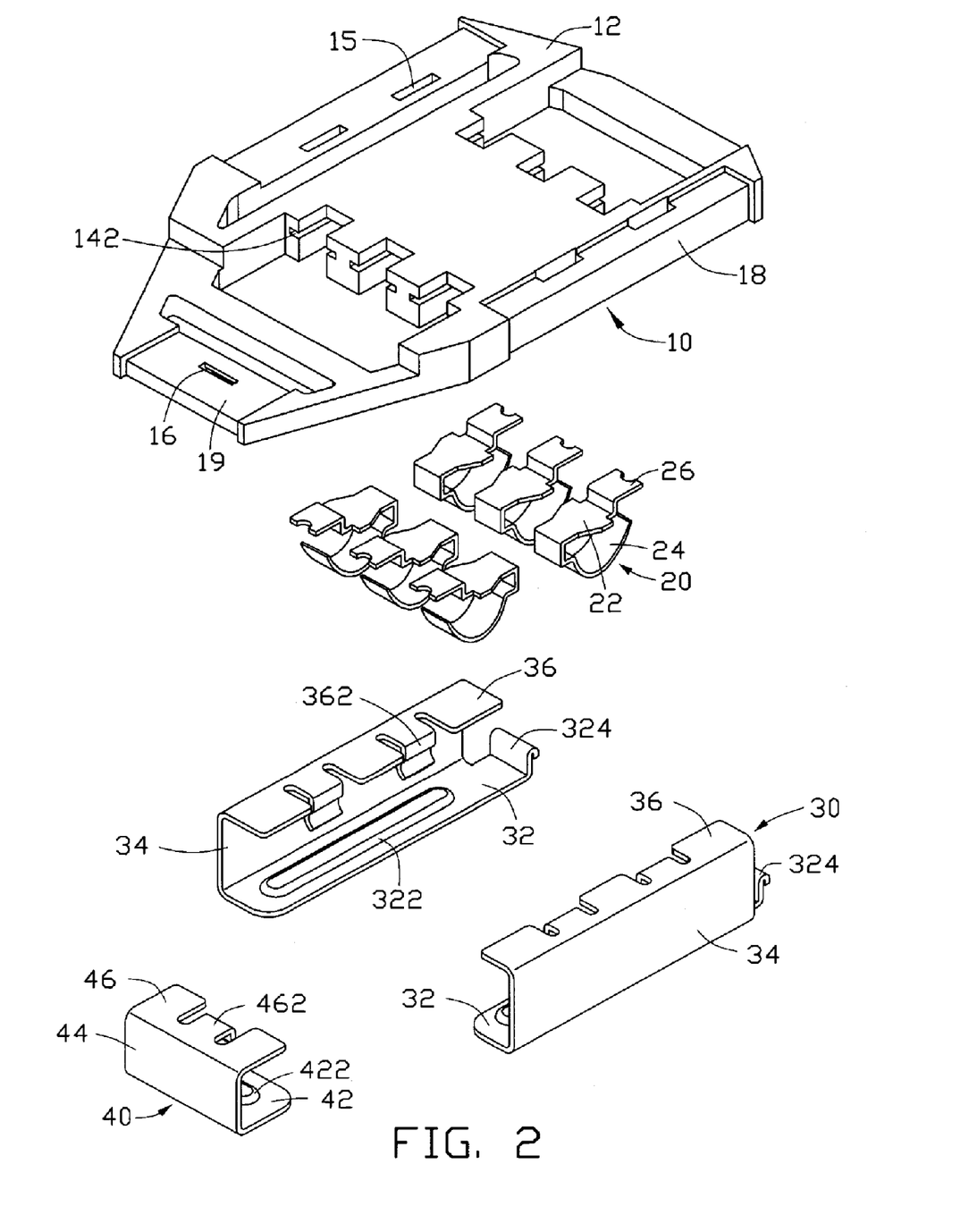
FIG. 2 is similar to FIG. 1, but shows another aspect.
Figure 3:
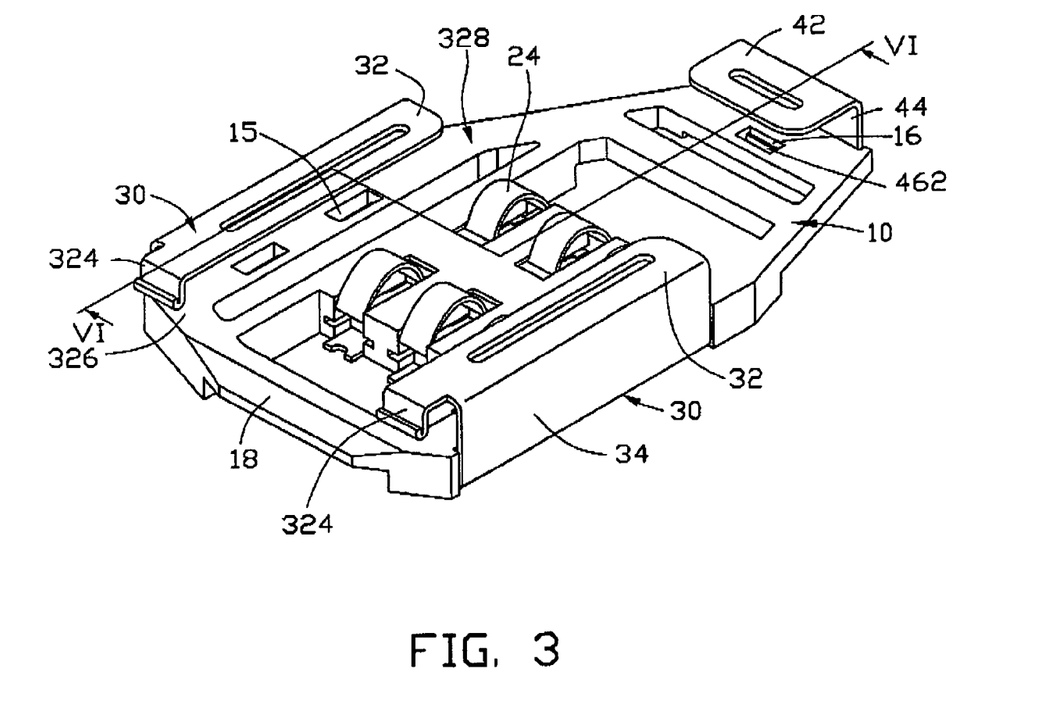
FIG. 3 is an assembled, isometric view of the chip card retaining mechanism of FIG. 1.

Referring also to FIG. 2, the base 10 is substantially rectangular. The base 10 has a first surface 11 and an opposite second surface 12. The base 10 has a rectangular opening 13 defined in a middle thereof. The base 10 has a retaining member 14 across the opening 13. The base 10 has a plurality of parallel terminal slots 142 parallel defined in the retaining member 14 and communicating with the first surface 11 and the second surface 12. The terminal slots 142 are configured (i.e. structured and arranged) for receiving the contact terminals 20. The base 10 defines four latch slots 15 at two parallel sides, with each two latch slots 15 spaced apart and disposed at each same side of the base 10. The base 10 defines an inserting slot 16 in a first end thereof. The base 10 has a bevel 17 at an opposite second end of the first surface 11. The base 10 also has two first recessed portion 18 defined at the second surface 12 and adjacent two opposite sides. Each recessed portion 18 extends from the second surface 12 to a corresponding sidewall. The base 10 has a second recessed portion 19 defined at the first end of the base 10.

Each contact terminal 20 is formed by punching and bending a band-shaped thin metal plate using a pressing machine or the like. Each contact terminal 20 includes a securing portion 22, an elastic contact 24 bending upward from the securing portion 22, and a welding contact 26 bending downward from the securing portion 22. Each contact terminal 20 is retained in a corresponding terminal slot 142, with the elastic contact 24 floatingly protruding from the first surface 11 of the base 10 and the welding contact 26 protruding from the second surface 12 of the base 10.

Each locking member 30 is substantially bracket-shaped (i.e. a straight central section with two perpendicular distal extensions). Each locking member 30 includes a first top plate 32, a first side plate 34, and a first bottom plate 36. The first side plate 34 connects the first top plate 32 and the first bottom plate 36. The first top plate 32 is provided with a first convex strip 322 at a surface thereof facing the first bottom plate 36. The first top plate 32 also is provided with a stopper 324 formed by bending one end thereof toward the first bottom plate 36. The first bottom plate 36 is provided with two parallel latches 362 formed by cutting and bending the bottom plate 36 toward the first top plate 32.

The resisting member 40 includes a second top plate 42, a second side plate 44, and a second bottom plate 46. The second side plate 44 connects the second top plate 42 to the second bottom plate 46. The second top plate 42 is provided with a second convex strip 422 at a surface thereof facing the second bottom plate 46. The second bottom plate 46 is provided with latching portion 462 by cutting and bending the second bottom plate 46 toward the second top plate 42.

Figure 5:
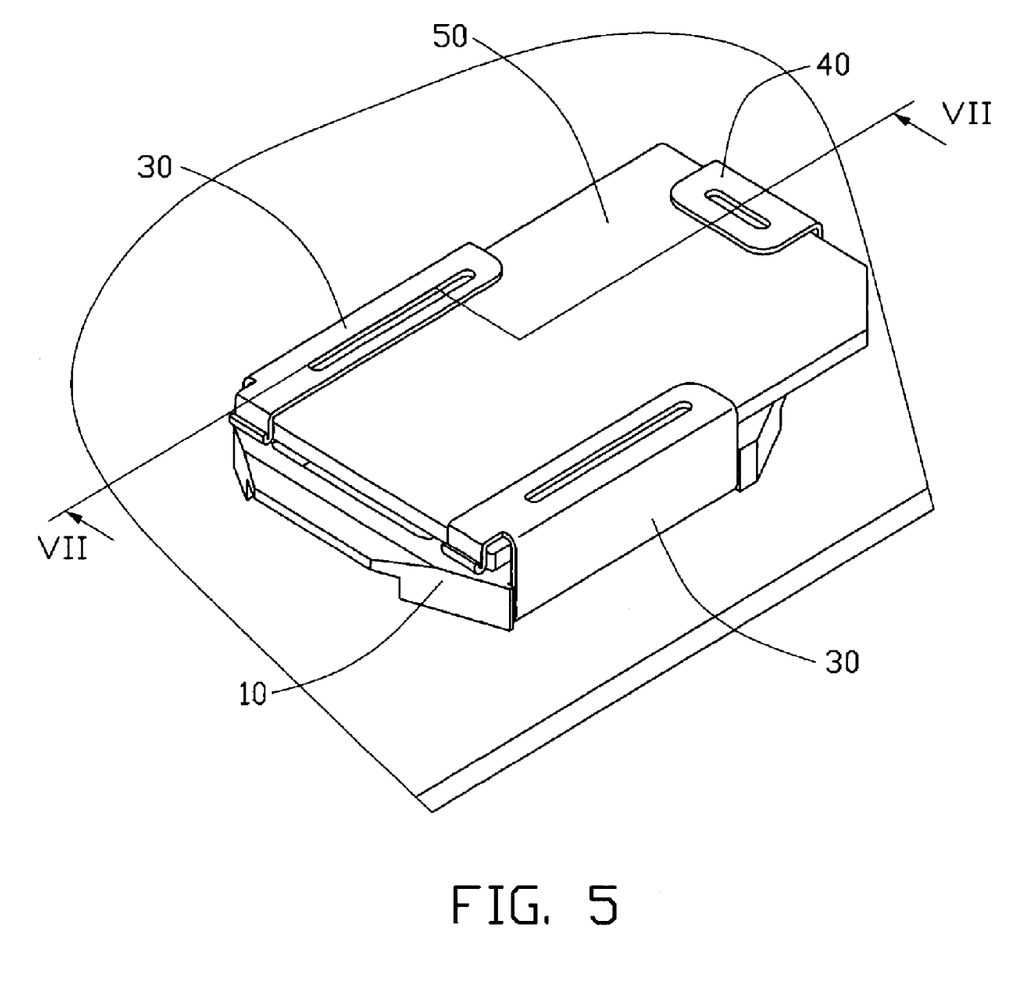
FIG. 5 is similar to FIG. 3, but showing a chip card assembled.

Referring to FIG. 5, the chip card 50 carries information that is necessary for operating the telephone and personal information of the owner and may be an integrated circuit card. The chip card 50 is electronically connected to a printed circuit board 60 (referring to FIG. 6) by the contact terminal 20.

Figure 4:
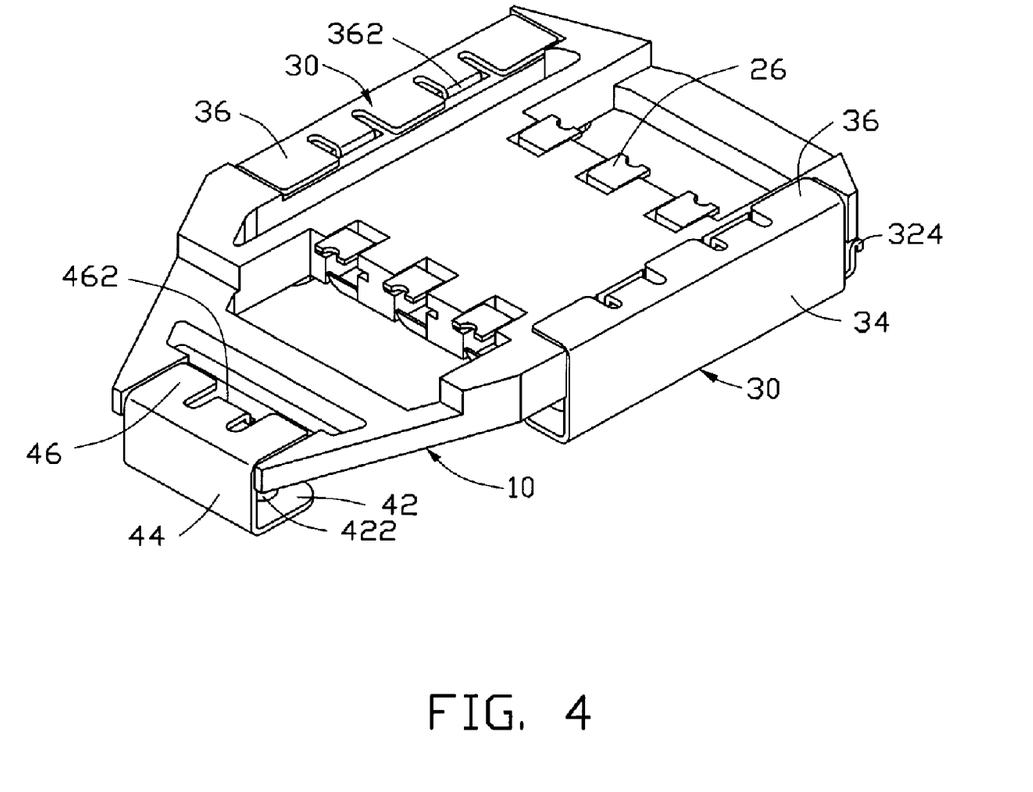
FIG. 4 is similar to FIG. 3, but shows another aspect.

Referring also to FIGS. 4-5, in assembly, each contact terminal 20 is retained in a corresponding terminal slot 14, with the elastic contact 24 floatingly protruding from the first surface 11 of the base 10 and the welding contact 26 protruding from the second surface 12 of the base 10. The welding contact 26 is welded to the printed circuit board 60. The latches 362 of each locking member 30 are engaged in the corresponding latch slots 15, with the first bottom plate 36 and the first side plate 32 of the locking member 30 abuttingly joining the first recessed portions 18 of the second surface 12 and the sidewalls of the base 10 respectively. The first convex strips 322 of the first top plate 32 face toward the first surface 11 of the base 10. The stoppers 324 of the locking members 30 are adjacent to the second end of the base 10. A gap 326, of greater size than a width of the chip card 50, is defined between the stoppers 324 and the first surface 11 of the base 10. The latching portion 462 of the resisting member 40 is inserted in and engaged with the inserting slot 16 of the base 10, with the second bottom plate 46 and the second side plate 42 of the locking member 30 both abuttingly the second recessed portion 19 of the base 10. The convex strips 422 of the second top plate 42 face the first surface 11 of the base 10. Thus, the base 10, the locking members 30 and the resisting member 40 cooperatively form a receiving space 328 for receiving the chip card 50 therein.

Figure 6:
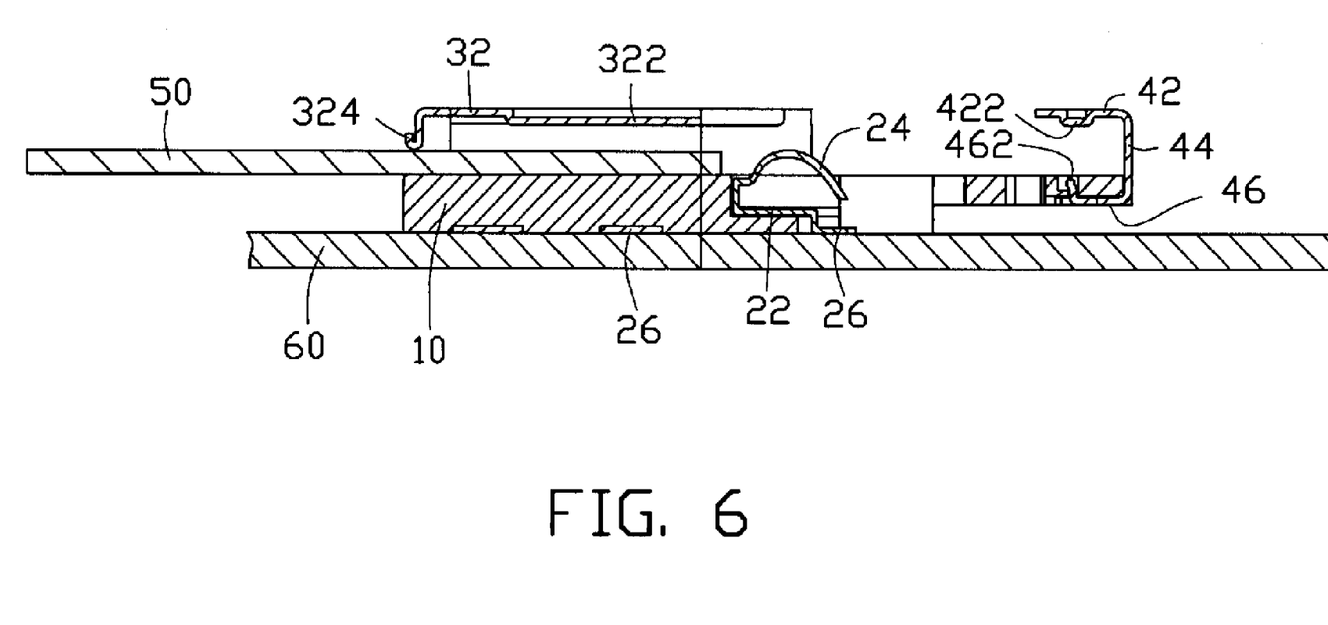
FIG. 6 is cross-sectional view taken along VI-VI line of FIG. 3, but showing a process of assembling the chip card.
Figure 7:
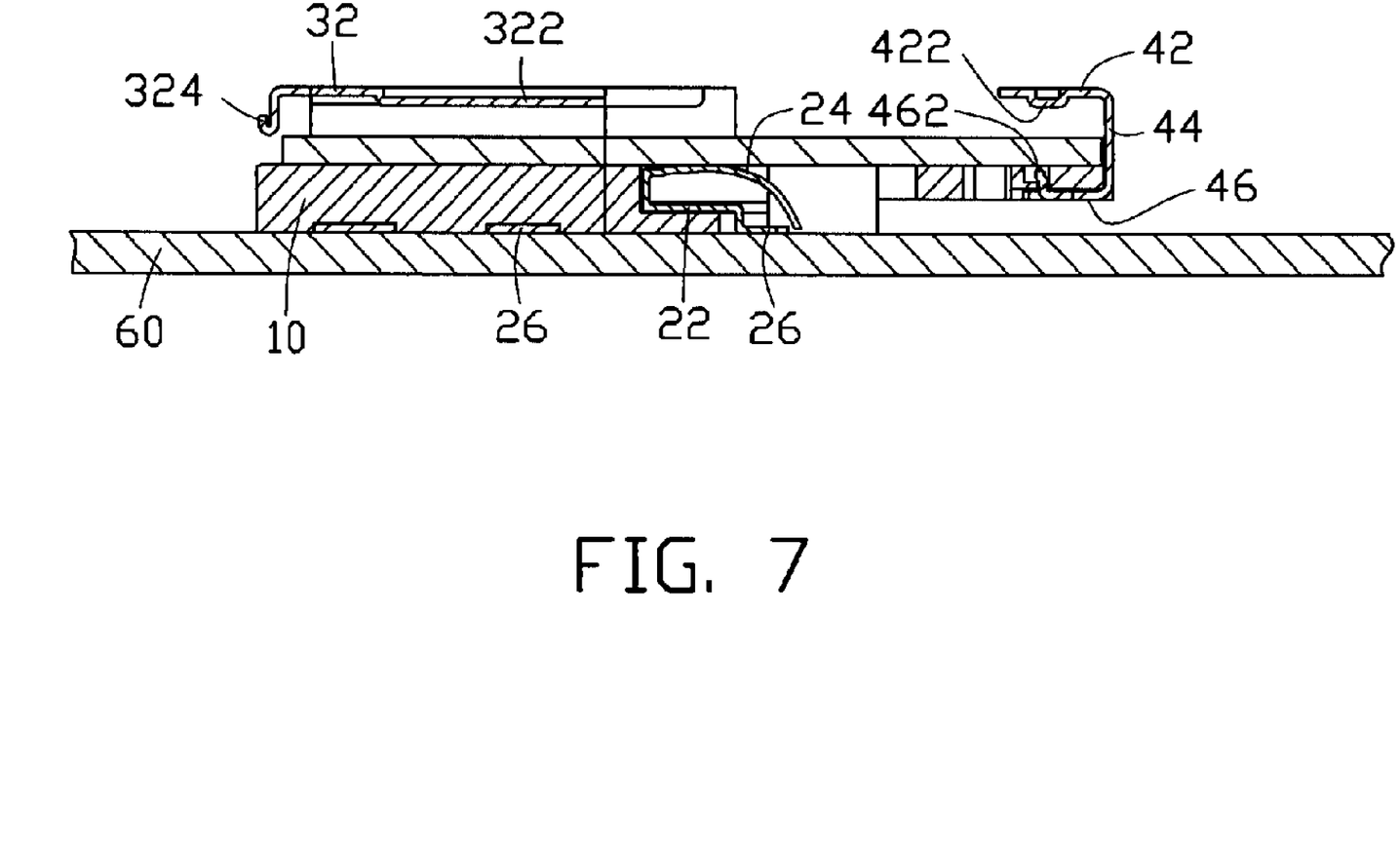
FIG. 7 is cross-sectional view taken along VII-VII line of FIG. 5, but showing the chip card completely assembled.

Referring to FIGS. 6-7, in assembling and mounting the chip card 50, the chip card 50 is aligned with the clearance 326 and pushed into the receiving space 328 from the second end of the base 10, with the guidance of the bevel 17 of the base 10. The chip card 50 is continuously pushed into the receiving space 328 and slides in the receiving space 328 under the guidance of the first side plates 32 of the locking member 30. When the chip card 50 abuts the elastic contacts 24 of the contact terminal 20, the chip card 50 is continuously pushed toward the first end of the base 10, with the chip card 50 compressing the elastic contacts 24. Thus, the elastic contacts 24 are elastically deformed and accumulate elastic force.

Figure 8:
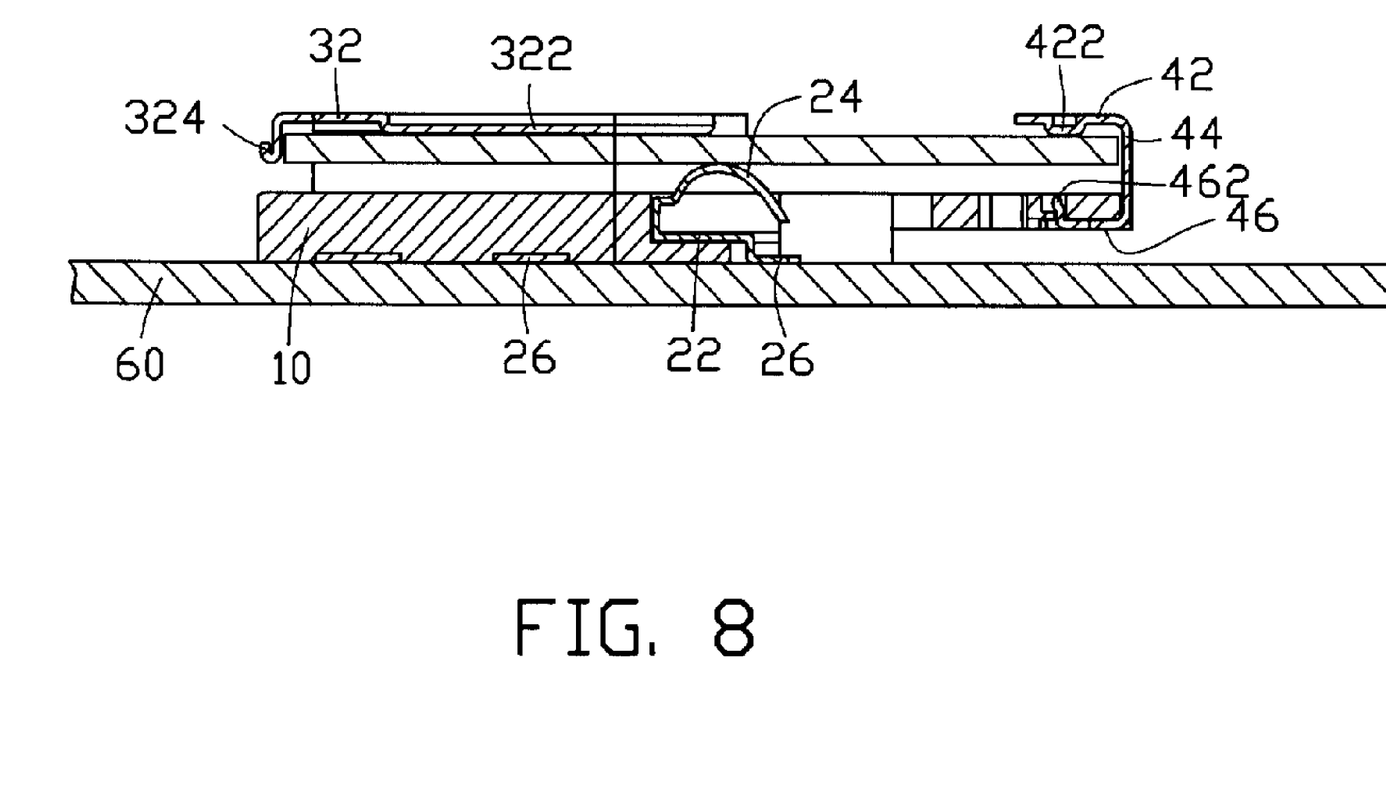
FIG. 8 is similar to FIG. 6, but showing the chip card locked.

When the chip card 50 is completely received in the receiving space 328, and a first end of the chip card 50 abuts the second side plate 44 of the resisting member 40 as shown in FIG. 8, the chip card 50 is lifted up by an elastic force of the elastic contacts 24 of the contact terminals 20, with an opposite second end of the chip card 50 abutting the stoppers 324 of the locking members 30 as shown in FIG. 9. In this state, the chip card 50 abuts the first convex strips 322 of the locking members 30 and the second convex strip 422 of the resisting member 40. Thus, the chip card 50 is stably locked in the receiving space 328 by the locking members 30 and the resisting member 40, and thus cannot become accidentally separated from the receiving space 328. Therefore, an effective electrical connection between the chip card 50 and the conduct terminals 20 is provided.

When removing the chip card 50, the chip card 50 is pressed downward to align with the clearance 326. The chip card 50 is pushed out of the receiving space 328 via clearance 326. As such, the chip card 50 can be removed from the base 10.

In an alternative embodiment, the locking members 30 are secured to the base 10 by means of adhering the first side plate 32 to the base 10, instead of the latches 362 engaging in the latch slots 15. Thus, the first bottom plate 36 of the locking members 30 may be omitted. The resisting member 40 is secured to the base by means of adhering the second side plate 44 to the base 10, instead of by means of the latching portion 462 engaging in the inserting slot 16. Thus, the second bottom plate 46 of the resisting member 40 may be omitted. The stoppers 324 may be formed by bending the first side plates 34 of the locking members 30 toward each other.

In a further alternative embodiment, the locking members 30 and the resisting member 40 may be integrally formed with the base 10. The locking members and the resisting member may be formed together.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A chip card remaining mechanism for retaining a chip card comprising:
   a base;
   terminals, the terminals retained in the base, the terminals having elastic contacts protruding from a first surface of the base for elastically abutting the chip card;
   a resisting member, the resisting member attached to a first end of the base, and the resisting member including a second side plate for abutting a first end of the chip card; and
   two locking members, the locking members attached to lateral sides of the base, each locking member having a first top plate extending over a top of the base, each locking member further comprising a stopper formed at one end of the first top plate for abutting an opposite second end of the chip card, the base, the locking members and the resisting member cooperatively defining a receiving space for receiving the chip card therein.

2. The chip card retaining mechanism as claimed in claim 1, wherein each locking member includes at least one latches, and the base has at least one latch slots adjacent to at least one sides thereof, the locking member being attached to the base by means of the latches engaging in the latch slots.

3. The chip card retaining mechanism as claimed in claim 2, wherein each locking member further includes a first bottom plate and a first side plate, the latches extending from the first bottom plate.

4. The chip card retaining mechanism as claimed in claim 3, wherein the first top plate extends from the first side plate and faces the first bottom plate, and the first top plate is configured for limiting movement of the chip card along a vertical direction.

5. The chip card retaining mechanism as claimed in claim 1, wherein each locking member is formed integrally with the base.

6. The chip card retaining mechanism as claimed in claim 1, wherein the resisting member includes a latching portion, and the base has an inserting slot adjacent to the first end thereof, the resisting member attached to the base by means of the latching portion engaging in the inserting slot.

7. The chip card retaining mechanism as claimed in claim 6, wherein the resisting member includes a second bottom plate, the latching portion extending from the second bottom plate.

8. The chip card retaining mechanism as claimed in claim 7, wherein the resisting member further includes a second top plate facing the second bottom plate, and the second top plate configured for limiting movement of the chip card along a vertical direction.

9. The chip card retaining mechanism as claimed in claim 1, wherein the resisting member is integrally formed with the base.

10. A chip card retaining mechanism for detachably retaining a chip card and allowing the chip card to be connected to terminals formed on a printed circuit board, the chip card retaining mechanism comprising:

a base, the base having a first surface for exposing the terminals;

a resisting member attached at a first end of the base, the resisting member comprising a second side plate and a second top plate extending from the second side plate, the second side plate adhered to an end wall of the base; and two locking members, the locking members arranged at lateral sides of the base, each locking member having a first top plate configured far limiting movement of the chip card along a vertical direction, each locking member further comprising a stopper formed at one end thereof and disposed at a movement path of the chip card along a horizontal direction, the base, and the locking members cooperatively defining a receiving space for receiving the chip card therein.

11. The chip card retaining mechanism as claimed in claim 10, wherein each locking member includes at least one latches, and the base has at least one latch slots adjacent to at least one sides thereof, the latching member attached to the base by means of the latches engaging in the latch slots.

12. The chip card retaining mechanism as claimed in claim 11, wherein each lacking member further includes a first bottom plate and a first side plate, the latches extending from the first bottom plate.

13. The chip card retaining mechanism as claimed in claim 12, wherein the first top plate extends from the first side plate and faces the bottom plate.

14. The chip card retaining mechanism as claimed in claim 10, wherein the resisting member comprises a second bottom plate opposite to the second top plate, the second bottom plate having a latching portion extending therefrom, and the base has an inserting slot, the latching portion being engagable in the inserting slot.

* * * * *